(No Model.)

F. E. GÄTCKE.
COUNTERACTING, DEFLECTING, AND DISTRIBUTING GASES AND FLAMES.

No. 549,235. Patented Nov. 5, 1895.

Witnesses:
B. S. Ober.

Inventor:
Friedrich Ernst Gätcke.

UNITED STATES PATENT OFFICE.

FRIEDRICH ERNST GÄTCKE, OF ALTONA, GERMANY.

COUNTERACTING, DEFLECTING, AND DISTRIBUTING GASES AND FLAMES.

SPECIFICATION forming part of Letters Patent No. 549,235, dated November 5, 1895.

Application filed March 6, 1895. Serial No. 540,725. (No model.)

*To all whom it may concern:*

Be it known that I, FRIEDRICH ERNST GÄTCKE, a subject of the German Emperor, and a resident of Altona, in the German Empire, have invented certain new and useful Improvements in Counteracting, Deflecting, and Distributing Gases and Flames in Chemical Works, Furnaces, &c., of which the following is a specification.

In smelting works, glass manufactories, and chemical works the operators, as is well known, are greatly inconvenienced and their health more or less endangered by the intense heat or the flame or deleterious gases issuing from apparatus whenever a door or gate closing an opening thereof is opened for any purpose, thereby inducing an outflow or outrush of gases, flame, or radiated heat.

My invention has for its object to protect the operator from intense radiated heat or the outflow or outrush of flame or deleterious gases from any apparatus on opening a door or gate thereof for any purpose.

The object aimed at I attain by interposing a protective screen formed by a suitable fluid, as steam or gas or a gaseous body, between the operator and an opening in an apparatus in which deleterious gases may be generated, or in which intense heat exists, or from which flame may issue when such opening is uncovered, or by diverting the flow of such gases or flame by means of such fluid.

To this end the invention consists in a novel means for attaining the objects of my invention and at the same time enable me to regulate the temperature within a smelter, furnace, or other like apparatus, as will now be fully described, reference being had to the accompanying drawings, in which—

Figure 1:
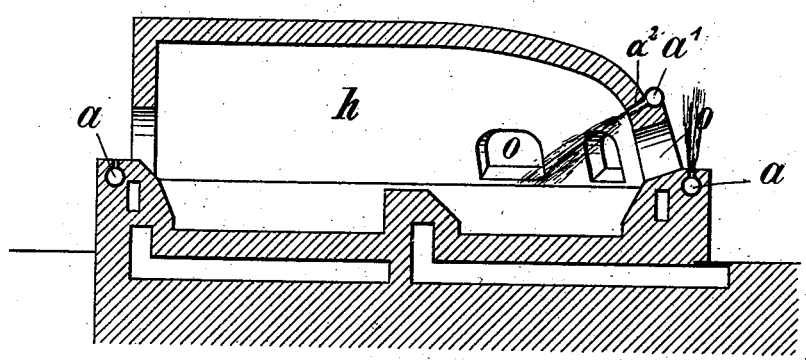
Figure 2:
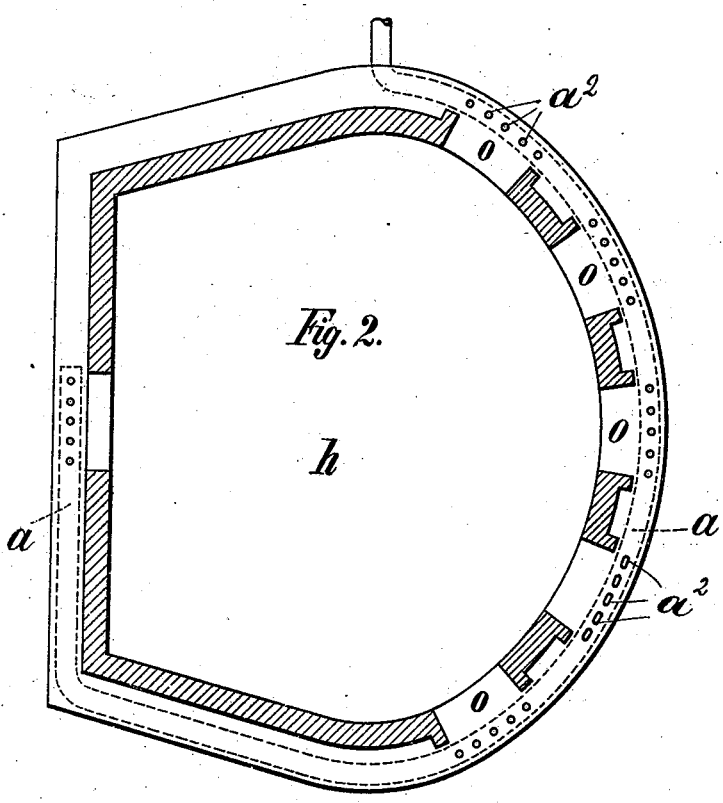
Figure 3:

Figure 1 is a longitudinal vertical section, and Fig. 2 a horizontal section, of a well-known construction of glass-furnace provided with means for carrying out my invention, given as an example only; and Fig. 3 is a detail view.

The furnace $h$ is encompassed exteriorly by a pipe, flue, or other suitable conduit $a$, arranged proximate to and in front of the interior edge of the furnace-openings O, at which points the conduit is provided with a plurality of ports or nozzles $a^2$, either circular or oblong, so as to cause a fluid, as a gaseous fluid—air, for instance—or steam, supplied to the conduit under suitable pressure to issue in the form of jets and form an intercepting-screen in front of said opening that will prevent the escape of radiated heat, or flame, or gases. The issuance of gases or flame from openings O may also be prevented by diverting the flow thereof from the openings by means of a conduit $a'$, Fig. 1, arranged above the openings O and having its outlets within the furnace and at such an angle relatively to the openings O that the fluid issuing from the jet-nozzles $a^2$ will form an oblique shield or screen within the furnace, thereby diverting the flow of gas, heat, or flame through such openings, and in certain class of apparatus both devices may be employed conjointly. It is obvious that by means of the jet-pipe $a'$ the temperature within the furnace can be controlled within certain limits, particularly when cold air is employed, while in other cases, where the introduction of steam into the apparatus is of advantage or required, steam may be supplied to conduit $a'$. Furthermore, by means of the pipe $a'$ deleterious gases generated within a closed chamber may be so admixed with another gas or gaseous body as to counteract their deleterious influences, and they can be so distributed and acted upon by the injected fluid as to force them to flow out of the apparatus through some other channel provided for their escape, while in cases where heated gases are to be kept in motion within a closed chamber this can also be accomplished by means of the jet-pipe $a'$ and such gases uniformly distributed within the apparatus.

It will of course be understood that the arrangement of the jet device and its construction will necessarily vary according to the nature or construction of the apparatus in conjunction with which it is to operate; but in all cases care should be had to give the jets of fluid the proper direction, so as to deflect or intercept, or deflect and intercept, the flow of gases through an opening or openings in the apparatus through which access is had thereto, and so that the jets will form a sufficiently compact screen, shield, or curtain through which neither gas, flame, nor radiated heat can pass. In many cases it may not be found practicable to give proper direction to the jets, and in this case I employ directing-plates *l*, Fig. 3, that are so arranged relatively to the jet-nozzles as to give the jets of fluid a proper direction.

Having thus described my invention, what I claim as new therein, and desire to secure by Letters Patent, is—

1. Means for preventing the diffusion, flow or passage of gases, heat or flame from one portion of a confined space to another, consisting of a screen or curtain of a fluid as a gas or gaseous compound or steam, for the purpose set forth.

2. Means for preventing the issuance of heat, flame or gas from an uncovered opening of an apparatus, consisting of a curtain or screen of a fluid, as a gas or gaseous compound or steam, extending across the inside of such opening, for the purpose set forth.

3. Means for preventing the issuance of heat, flame or gas from an uncovered opening of an apparatus, consisting of a screen or curtain of a fluid, as a gas or gaseous compound or steam, extending across the inside and outside of such opening, for the purpose set forth.

4. The combination in an apparatus such as described with the opening or openings thereof, of a jet pipe adapted to project jets of fluid across such opening, for the purpose set forth.

5. The combination in an apparatus such as described with the opening or openings thereof, of a jet pipe adapted to project jets of fluid diagonally or obliquely across such opening, for the purpose set forth.

In testimony that I claim the foregoing as my invention I have signed my name, in presence of two witnesses, this 15th day of February, 1895.

FRIEDRICH ERNST GÄTCKE.

Witnesses:
ALEXANDER SPECHT,
DIEDRICH PETERSEN.